Sept. 13, 1960 J. D. DORSEY ET AL 2,952,280
CONVERTIBLE LATHE AND DRILL PRESS
Filed Feb. 16, 1959 2 Sheets-Sheet 1

INVENTORS
JOHN D. DORSEY
and RONALD D. NICHOLAS
BY
Charles Richard Werner
ATTORNEY Sept. 13, 1960  J. D. DORSEY ET AL  2,952,280
CONVERTIBLE LATHE AND DRILL PRESS
Filed Feb. 16, 1959  2 Sheets-Sheet 2
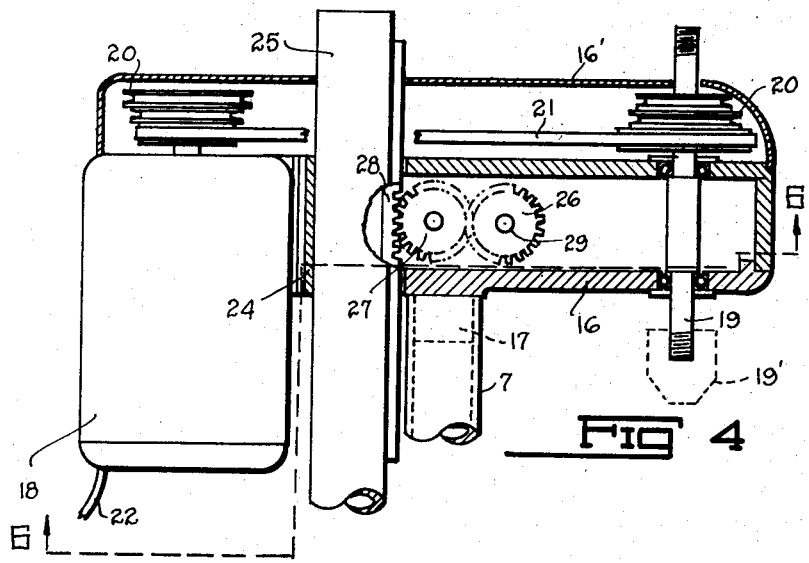
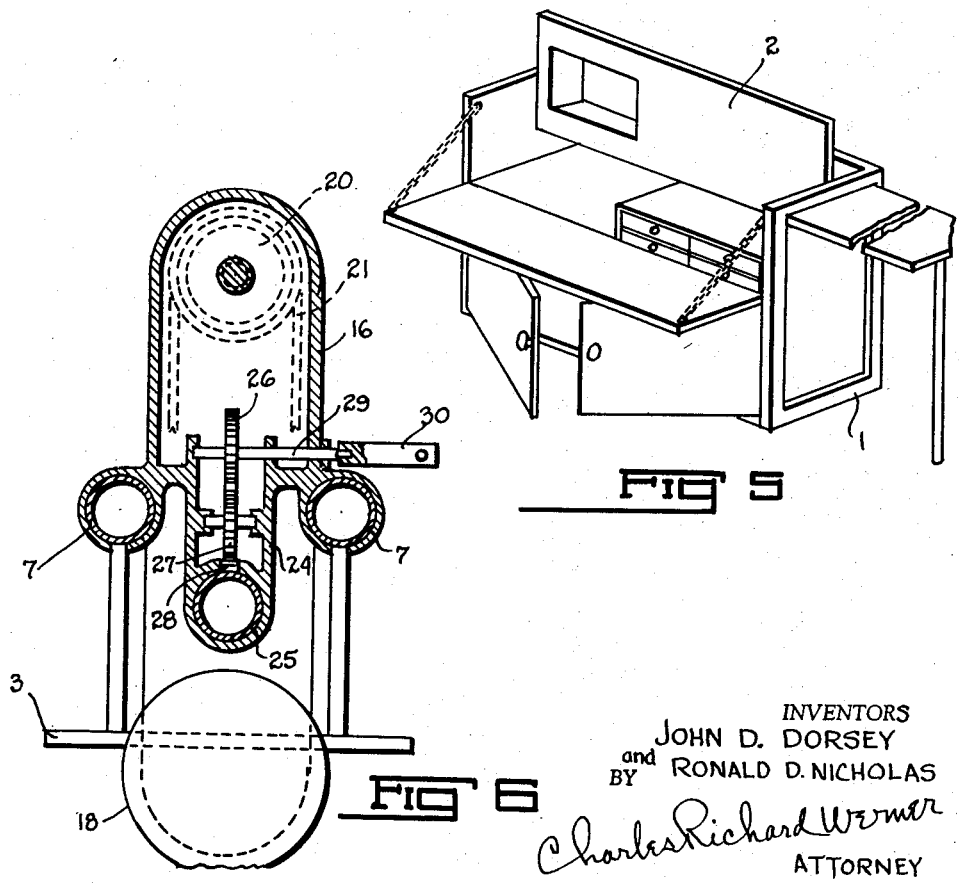
INVENTORS
JOHN D. DORSEY
and
BY RONALD D. NICHOLAS
Charles Richard Werner
ATTORNEY 0
United States Patent Office 2,952,280
Patented Sept. 13, 1960

2,952,280

CONVERTIBLE LATHE AND DRILL PRESS

John D. Dorsey, 516 S. Green, and Ronald D. Nicholas, 5108 Zimmerley, both of Wichita, Kans.

Filed Feb. 16, 1959, Ser. No. 793,579

7 Claims. (Cl. 144—1)

This invention relates in general to material working machines and in particular to a convertible type of machine which can be changed or adjusted to perform several different material working functions.

One object of the invention is to provide a material working machine housed in a cabinet from which it can easily be swung into and out of working position.

Another object of our invention is to provide a material working machine usable in one position as a lathe with added facilities for use as a sander, planer, saw, grinder, buffer, etc., by use of specific attachments; a portion of said machine being swingable to a vertical position for use as a drill press, router, shaper, etc.

One more object of our invention is to provide for transposition of the material working machine from one function to another with a minimum of effort and time, and without the need for critical adjustments after each change.

And still another object of our invention is to provide a convertible material working machine which is relatively simple, inexpensive to manufacture, and capable of many functions.

Further objects and advantages as well as the construction and manner of use of our invention will be better understood by reference to the following specification in connection with the accompanying drawings in which:

Fig. 4 is an enlarged detailed view, partly in section through the headstock showing the pulley drive and the control means when the device is used in vertical position as a drill press.

Fig. 5 is a reduced isometric view of a cabinet in which the machine is stored.

Fig. 6 is a vertical detailed view on the line 6—6 of Fig. 4 with parts being shown in section.

Figure 1:
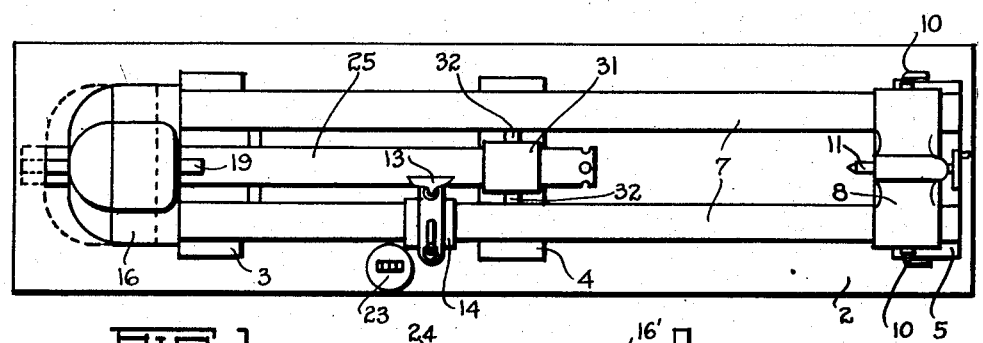
Fig. 1 is a top plan view of the convertible material working machine mounted on a suitable cabinet and in position for use as a lathe, with dotted line position showing endwise movement of a portion of the device preparatory to swinging same vertically for use as a drill press.

Referring now to the drawings by numerals of reference, 1 designates any suitable cabinet with a top 2 to which the convertible material working machine is attached, said top serving as a cover for the cabinet when the machine is stored and not in use.

Brackets 3, 4 and 5 are secured to the top 2 and have upstanding spaced flanges 6 secured to a pair of parallel, spaced, horizontal tubes or rods 7 serving as a lathe bed.

Bracket 3 is secured adjacent one end of the horizontal tubes or supports 7. Bracket 4 is secured to said supports 7 intermediate the ends thereof, and bracket 5 is secured to the supports 7 a short distance in from the end of said supports 7 opposite bracket 3 for the purpose hereinafter specified.

Tailstock 8 is slidably mounted on the supports 7 with slots 9 permitting said tailstock to slide by the vertical flanges 6, suitable locking members 10 being provided to hold the tailstock in adjusted position. A conventional tailstock spindle 11 and feed handle 12 may be provided on the tailstock.

A conventional tool rest 13 on collar 14 may be adjustably mounted on one of the tubes or supports 7 and locked in adjusted position by suitable locking member 15.

The headstock housing 16 has projections 17 receivable by tubes or supports 7. A suitable motor 18 is carried by the headstock housing and drives spindle 19 through pulleys 20 and belt 21 positioned internally of said housing 16. A flexible electrical conductor 22 connects the motor 18 through a start-stop switch 23 to a source of current.

The spindle 19, which is suitably journaled in and extends from both sides of the housing 16, may carry any suitable chuck 19' in which any attachment may be secured (see Fig. 4); or the spindle 19 may directly support a sawblade, grinder, sander, bandsaw, jointer, and any one of many other attachments, the specific use of which is not considered patentable although they enhance the commercial value of our device.

A central portion 24 of the headstock housing 16 is sleeved on a central tube or support 25, and a toothed wheel 26 or gear is pivotally mounted in the housing and engages a second toothed wheel or gear 27 which in turn engages a rack 28 carried by the tube or support 25. A shaft 29, on which toothed wheel 26 is carried, extends from the housing 16 and is rotatable by means of a detachable handle 30. (See Figs. 4 and 6.)

Central tube or support 25 is sleeved in collar 31 which is pivotally mounted in upstanding flanges 6 by means of stub shafts 32. (See Figs. 2 and 3.) Springs 33 surrounding shafts 32 are arranged to normally urge the support 25 to upright position. A collar 34 mounted to plate of bracket 4 receives the lower end of support 25 and may be provided with locking means insertable in apertures 25' and 34' to lock said support 25 against vertical or pivotal movement.

Having explained the various elements of our invention, the operation, which is very simple, is as follows:

When the machine is used as a lathe or in horizontal position, the headstock housing 16 is in engagement with both tubes or supports 7 as well as with the central tube or rod 25.

Figure 2:
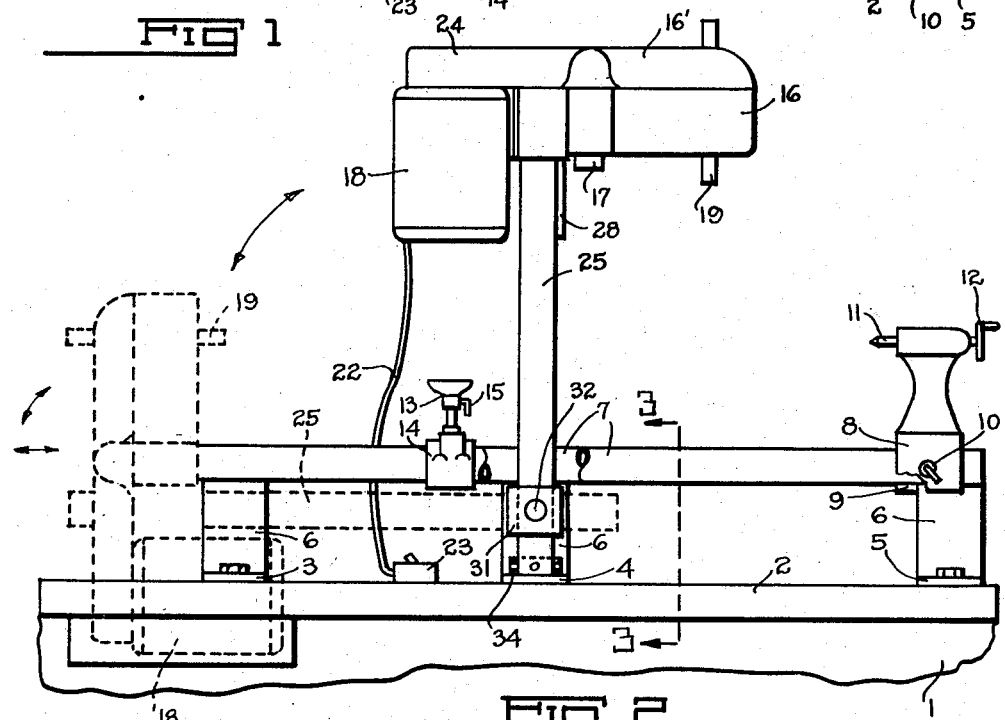
Fig. 2 is a front elevational view of the same when used as a drill press, the dotted lines indicating the lathe position.
Figure 3:
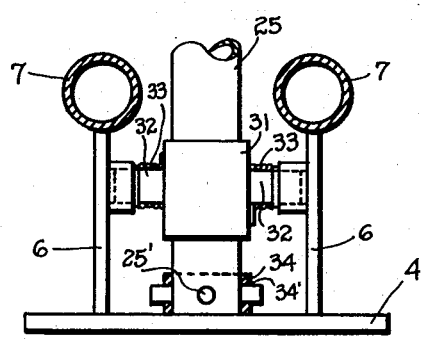
Fig. 3 is an enlarged detailed view, partly in section on line 3—3 of Fig. 2 showing the hinged member for the drill press standard in vertical position.

It is to be noted that the central tube or support 25 is of sufficient length whereby when the support 25 and headstock housing 16 are moved to clear the end of said supports 7, central support 25 will remain in engagement with collar 31, and the housing and support 25 may be swung to a vertical position, aided by springs 33. When the lower end of support 25 is in alignment with collar 34 it is dropped into and locked to said collar in any one of several horizontally disposed positions. As shown in Fig. 2 the central support 25 has been swung up in an arc of 90° and it can now be pivoted 90° through a horizontal plane for operation from the front of the machine. The device is now ready for use as a drill press, shaper, router, or any other function which it can perform in this position.

It will be seen that our device can be changed from one position to another very simply and quickly; that it can be retained in rigid operating position either vertically or horizontally; and that in either position it can perform many different functions merely by securing various auxiliary attachments to the machine. It can be neatly stored in a suitable cabinet where the various attachments and tools can be kept, the entire assembly making a very compact and commercially attractive unit.

It is obvious that changes in form, proportion and details of construction may be resorted to without departing from the spirit of our invention and we reserve the right to all such changes as come within the scope of these specifications and the claims which follow:

What we claim as new and desire to secure by Letters Patent is:

1. In a material working machine, a pair of spaced parallel horizontal supports forming a lathe bed, a pivotal support located intermediate the ends of, at right angles to and between the horizontal supports; a cylindrical shaft longitudinally slidably and rotatably carried by the pivotal support with its axis normal to that of said pivotal support, a housing carried by the shaft and movable with the shaft into vertical or horizontal parallel relation to the horizontal supports, said housing being slidably movable into and out of engagement with the horizontal supports when the shaft is in parallel relation to said supports.

2. In a material working machine, a pair of spaced parallel horizontal supports forming a lathe bed, a tailstock slidably adjustable on one end of the horizontal supports, a headstock removably related to the other end of the horizontal supports, a pivotal support located below, transversely of, and intermediate the ends of the horizontal supports, a cylindrical shaft longitudinally slidably and rotatably related to the pivotal support with its axis normal to that of said pivotal support, said shaft being horizontally disposed below and between the spaced horizontal supports and parallel thereto when in one operating position and swingable about the pivotal support to a vertical operating position, said headstock being adjustably carried axially of and by the shaft.

3. The structure as specified in claim 2, said removable relation including stub projections on the headstock, said stub projections being removably receivable by the horizontal supports when the shaft is in parallel relation to said supports, the headstock remaining in engagement with the shaft after the stub projections are clear of the headstock.

4. The structure as specified in claim 2, a rack carried by the end of the cylindrical shaft on which the headstock is adjustably carried, interengaging gears carried by the headstock, one of said gears engaging the rack, a shaft for the other gear, said shaft extending from the headstock, and means for rotating the shaft and gears for moving the headstock longitudinally on the cylindrical shaft.

5. In a material working machine, a pair of spaced parallel horizontal supports forming a lathe bed, a tailstock slidably supported on one end of the horizontal supports, a headstock removably related to the other end of the horizontal supports, end supporting brackets for the horizontal supports, an intermediate supporting bracket for the horizontal supports, a pivotal support carried by the intermediate supporting bracket below, at right angles to, and between the horizontal supports, a cylindrical shaft longitudinally slidably and rotatably related to the pivotal support with its axis normal to that of said pivotal support, said shaft extending horizontally below, parallel to, and between the spaced horizontal supports when in one operating position and swingable about the pivotal support to a vertical operating position, said headstock being adjustably carried axially of and by the shaft.

6. The structure as specified in claim 2, and spring return means on the pivotal support normally urging the shaft into vertical position.

7. In a material working machine convertible from a horizontally operating device to a vertically operating device, a lathe bed, a tailstock on the lathe bed, a headstock movable horizontally into and out of engagement with the lathe bed, a cylindrical shaft parallel to the lathe bed, one end of said shaft being pivotally supported on the lathe bed for rotation about the longitudinal axis of the cylindrical shaft and for swinging movement about a horizontal axis, the other end of the shaft slidably and adjustably engaging the headstock, conversion of the machine from a horizontally operating device to a vertically operating device being accomplished by moving the headstock horizontally out of engagement with the lathe bed while still engaging the cylindrical shaft, and swinging the headstock and cylindrical shaft to a vertical position with the headstock above the lathe bed.

References Cited in the file of this patent

UNITED STATES PATENTS

| 801,705 | Bauser | Oct. 10, 1905 |
| 1,422,971 | Hanson | July 18, 1922 |
| 1,510,167 | Wilhelm | Sept. 30, 1924 |
| 2,200,799 | Miller | May 14, 1940 |
| 2,259,899 | Long | Oct. 21, 1941 |
| 2,517,608 | Taylor | Aug. 8, 1950 |
| 2,661,037 | McGihon | Dec. 1, 1953 |

FOREIGN PATENTS

| 689,368 | France | May 26, 1930 |